(12) United States Patent
Pitwon

(10) Patent No.: US 10,288,808 B1
(45) Date of Patent: May 14, 2019

(54) LASER DIRECT WRITING FOR NON-LINEAR WAVEGUIDES

(71) Applicant: Seagate Technology LLC, Cupertino, CA (US)

(72) Inventor: Richard C. A. Pitwon, Fareham (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/004,573

(22) Filed: Jan. 22, 2016

(51) Int. Cl.
| | |
|---|---|
| G02B 6/00 | (2006.01) |
| G02B 6/138 | (2006.01) |
| G02B 6/125 | (2006.01) |
| G02B 6/122 | (2006.01) |
| G02B 27/09 | (2006.01) |

(52) U.S. Cl.
CPC ............ *G02B 6/138* (2013.01); *G02B 6/125* (2013.01); *G02B 6/1221* (2013.01); *G02B 27/0927* (2013.01)

(58) Field of Classification Search
None
See application file for complete search history.

(56) References Cited

U.S. PATENT DOCUMENTS

| | | | |
|---|---|---|---|
| 4,201,447 A | 5/1980 | Thompson et al. | |
| 4,391,516 A | 7/1983 | Boggs et al. | |
| 4,801,184 A | 1/1989 | Revelli | |
| 4,856,859 A | 8/1989 | Imoto | |
| 5,084,017 A * | 1/1992 | Maffetone | A61M 5/5066 604/110 |
| 5,090,962 A * | 2/1992 | Landry, Jr. | A61M 5/31511 604/110 |
| 5,696,865 A | 12/1997 | Beeson et al. | |
| 5,996,375 A | 12/1999 | Nakai et al. | |
| 6,130,970 A | 10/2000 | Hong et al. | |
| 6,169,830 B1 | 1/2001 | Kewitsch et al. | |
| 6,393,185 B1 | 5/2002 | Deacon | |
| 6,577,799 B1 | 6/2003 | Charters et al. | |

(Continued)

OTHER PUBLICATIONS

'A Taper to Reduce the Straight-to-Bend Transition Loss in Compact Silicon Waveguides' 2010, IEEE Photonics Technology Letters, Photonics Technology Letters, IEEE, IEEE Photon. Technol. Lett, 15, p. 1174, IEEE Xplore Digital Library, EBSCOhost, viewed Mar. 11, 2018.t (Year: 2010).*

(Continued)

*Primary Examiner* — Seyed Masoud Malekzadeh
*Assistant Examiner* — Manley L Cummins, IV
(74) *Attorney, Agent, or Firm* — Mueting, Raasch & Gebhardt, P.A.

(57) ABSTRACT

A waveguide includes multiple segments having different bend radii with substantially consistent cure profiles and related methods and systems for making and using the same. The waveguide is formed by modifying a laser beam used to write the waveguide to provide the consistent cure profile in the multiple segments. A marker characteristic of laser writing may be present in the waveguide. A method or system modifies an intensity profile or a shape profile of a laser beam to proactively compensate for exposure convolution based on the geometry of each waveguide segment. A convolution compensator is positioned in the path of the laser beam to modify the beam spot profile during writing to form the multiple segments of the waveguide in a photocurable layer.

10 Claims, 11 Drawing Sheets

(56) References Cited

U.S. PATENT DOCUMENTS

| | | | |
|---|---|---|---|
| 6,751,381 B1 | 6/2004 | Popelek et al. | |
| 6,832,023 B1 | 12/2004 | Gaylord et al. | |
| 6,904,219 B1 | 6/2005 | Fermann | |
| 7,031,584 B2 | 4/2006 | Lee et al. | |
| 7,260,290 B1 | 8/2007 | Greiner et al. | |
| 7,327,908 B1 | 2/2008 | Iazikov et al. | |
| 7,359,597 B1 | 4/2008 | Iazikov et al. | |
| 7,391,947 B1 | 6/2008 | Bado et al. | |
| 7,419,478 B1 * | 9/2008 | Reilly | A61M 5/14546 604/218 |
| 7,682,345 B2 * | 3/2010 | Savage | A61M 5/007 604/151 |
| RE41,570 E | 8/2010 | Greiner et al. | |
| RE42,407 E | 5/2011 | Iazikov et al. | |
| 8,737,777 B2 | 5/2014 | Pitwon | |
| 9,044,907 B2 | 6/2015 | Pitwon | |
| 9,321,126 B2 | 4/2016 | Xu et al. | |
| 9,904,018 B2 | 2/2018 | Herman et al. | |
| 2001/0051020 A1 | 12/2001 | Kashyap | |
| 2002/0085824 A1 | 7/2002 | Dugan et al. | |
| 2002/0186924 A1 | 12/2002 | Kohnke et al. | |
| 2003/0035640 A1 | 2/2003 | Dugan et al. | |
| 2003/0044118 A1 | 3/2003 | Zhou et al. | |
| 2003/0053732 A1 | 3/2003 | Eldada | |
| 2003/0063884 A1 | 4/2003 | Smith et al. | |
| 2003/0099452 A1 | 5/2003 | Borrelli et al. | |
| 2004/0208466 A1 | 10/2004 | Mossberg et al. | |
| 2004/0218859 A1 | 11/2004 | Yamashita et al. | |
| 2005/0069257 A1 | 3/2005 | Bhagavatula et al. | |
| 2005/0078912 A1 | 4/2005 | Iazikov et al. | |
| 2005/0135747 A1 | 6/2005 | Greiner et al. | |
| 2005/0232541 A1 | 10/2005 | Mihailov et al. | |
| 2005/0259935 A1 | 11/2005 | Hamada | |
| 2006/0029322 A1 | 2/2006 | Mihailov et al. | |
| 2006/0127024 A1 | 6/2006 | Smith et al. | |
| 2006/0159394 A1 | 7/2006 | Grubsky | |
| 2006/0165360 A1 | 7/2006 | Siegel et al. | |
| 2009/0218519 A1 | 9/2009 | McLeod | |
| 2009/0304331 A1 | 12/2009 | Herman et al. | |
| 2010/0157418 A1 | 6/2010 | Dong et al. | |
| 2011/0149382 A1 | 6/2011 | Her | |
| 2012/0039567 A1 | 2/2012 | Herman et al. | |
| 2012/0106893 A1 | 5/2012 | Kashyap et al. | |
| 2013/0187301 A1 * | 7/2013 | Pitwon | B29D 11/00682 264/1.27 |
| 2014/0094749 A1 * | 4/2014 | Cowan | A61M 5/315 604/93.01 |
| 2015/0234195 A1 | 8/2015 | Honea et al. | |
| 2016/0111851 A1 | 4/2016 | Kliner et al. | |
| 2017/0255110 A1 | 9/2017 | Richter et al. | |

OTHER PUBLICATIONS

Vivien, Laurent. Handbook of Silicon Photonics. pp. 612-677. Boca Raton: CRC Press, 2013. eBook Index, EBSCOhost (accessed Mar. 11, 2018). (Year: 2013).*

U.S. Appl. No. 15/004,578, filed Jan. 22, 2016, Pitwon.

Kruse, et al., "Laser direct writing of complex radially varying single-mode polymer waveguide structures", Jul.-Sep, 2015, *J Micro/Nanolith. MEMS MOEMS*; 14(3):034502-1-6, 6 pages.

* cited by examiner

LASER DIRECT WRITING FOR NON-LINEAR WAVEGUIDES

The disclosure herein relates to optical waveguides and their fabrication to reduce optical losses in an optical waveguide on a printed circuit board.

SUMMARY

The present disclosure relates to a waveguide formed by modifying a laser beam to fabricate a consistent refractive index profile between segments having different bend radii of an optical polymer waveguide formed by laser direct writing (LDW). The disclosure also relates to a method and system for modifying the laser beam spot profile used to trace and cure the waveguide to provide an accurate and consistent cure profile in the waveguide.

In at least one embodiment, a method includes tracing a non-linear waveguide segment in a photo-curable layer with a laser beam. The laser beam defines a spot profile. The laser beam is passed through a convolution compensator to modify at least a portion of the laser beam in response to at least one geometric property of the non-linear waveguide segment to define a modified beam portion of the laser beam and a modified spot profile different than the spot profile. A photo-curable layer is cured along the non-linear waveguide segment with the modified beam portion of the laser beam having the modified spot profile.

In another embodiment, a system includes an electromagnetic radiation source to cure a waveguide by directing a laser beam. The laser beam defines a spot profile. The system further includes a convolution compensator positioned to modify at least one of an intensity profile and a shape of the spot profile to compensate for exposure convolution in a photo-curable layer when the laser beam is directed at the photo-curable layer and translated along a non-linear path in a plane parallel to the photo-curable layer.

In a further embodiment, an apparatus includes a first waveguide segment, a second waveguide segment in series with the first waveguide segment, and a height profile. The first waveguide segment defines a first bend radius and a first cure profile. The second waveguide segment defines a second bend radius different than the first bend radius and a second cure profile substantially matching the first cure profile. The height profile defines a non-uniform height portion adjacent a side of at least one of the first and second waveguide segments.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
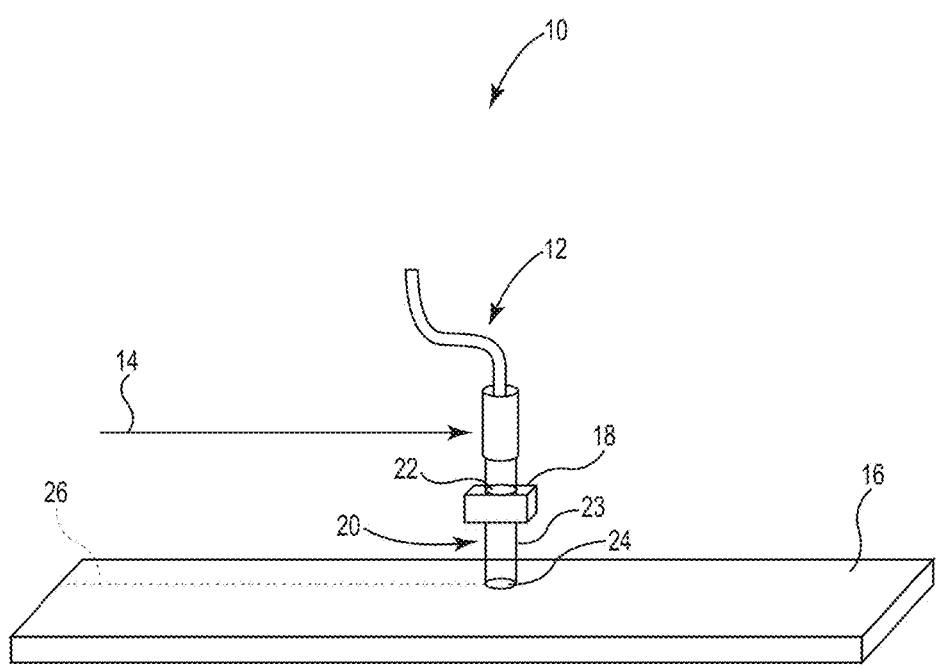
FIG. 1 is a schematic diagram of an exemplary waveguide laser direct writing system.

Polymer based optical waveguides provide numerous desirable properties for use in a multitude of electronic devices, including in some embodiments, data storage devices, network components, network appliances, routers, hubs and other similar devices. These waveguides can be formed on printed circuit boards (PCB), which, in turn, would be referred to as optical PCBs, or more generally, as optical boards. These waveguides and optical PCBs can function as a component or building block of a larger structure or apparatus. Alternatively the waveguides and optical PCBs can function on their own without any other related devices or structures. The waveguides and optical PCBs can be integrated and connected to other structures and different components as well as in order to provide an assembly.

The disclosure herein relates to optical waveguide fabrication to reduce optical losses in an optical waveguide on a printed circuit board. The present disclosure relates to a waveguide formed by modifying a laser beam to fabricate a consistent refractive index profile between segments having different bend radii of an optical polymer waveguide formed by laser direct writing (LDW). The disclosure also relates to a method and system for modifying the laser beam spot profile used to trace and cure the waveguide to provide an accurate and consistent cure profile in the waveguide.

An illustrative waveguide LDW method modifies an intensity profile, a shape profile, or both of a laser beam spot profile to proactively compensate for exposure convolution based on the characteristics of the waveguide segment to be written. In many embodiments, the method utilizes a convolution compensator positioned in the path of a laser beam to modify the laser beam spot profile during tracing and curing steps to form a waveguide segment in a photo-curable layer. The convolution compensator is operable to modify the intensity profile, the shape, or both of the spot profile based on the geometric properties of the waveguide segment being traced and cured. In some embodiments, the convolution compensator includes a reconfigurable density filter, an adaptive lens, or any number of both. It is to be understood that the convolution compensator configurations described herein are merely exemplary, and other convolution compensator configurations having additional or fewer compensation elements in any similar (e.g., equivalent) arrangement are considered by the present disclosure. While the present disclosure is not so limited, an appreciation of various aspects of the disclosure will be gained through a discussion provided below.

The methods described herein form a waveguide that more closely matches a desired or target cure profile along one or more waveguide segments. In some embodiments, the waveguide cure profile is more consistent along multiple waveguide segments. For example, the waveguide cure profile of a non-linear waveguide segment may be more consistent with, or substantially match, the waveguide cure profile of a proceeding or preceding linear segment in the same waveguide. In additional or alternative embodiments, the waveguide cure profile more closely matches a desired or target cure profile for all waveguide segments by compensating for exposure convolution. For example, a non-linear waveguide segment has a desirable symmetric waveguide profile instead of an undesirable asymmetric profile. Although in other examples, an asymmetric waveguide profile may be desirable.

Recognizing that the cure profile of a waveguide influences the refractive index profile, that mismatches in refractive index profiles between consecutive segments can contribute to optical losses, and that the actual waveguide refractive index profile may differ from the target refractive index profile due to exposure convolution, the methods described herein facilitate the formation of consistent and more accurate cure profiles for a waveguide for linear waveguide segments, non-linear segments, and combinations thereof. This may result in an exemplary waveguide with less optical loss in use than a waveguide formed by other methods, systems, or apparatuses.

Figure 3A:
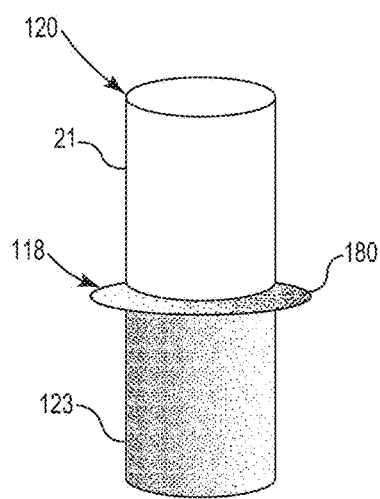
FIGS. 3A and 3B are schematic diagrams of a laser beam with a uniform spot profile, an exemplary convolution compensator in position to modify the beam, and related cross-sections.
Figure 3B:
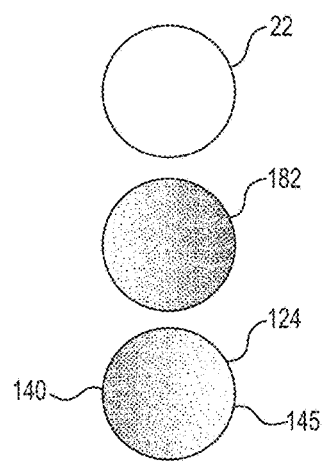
Figure 4:
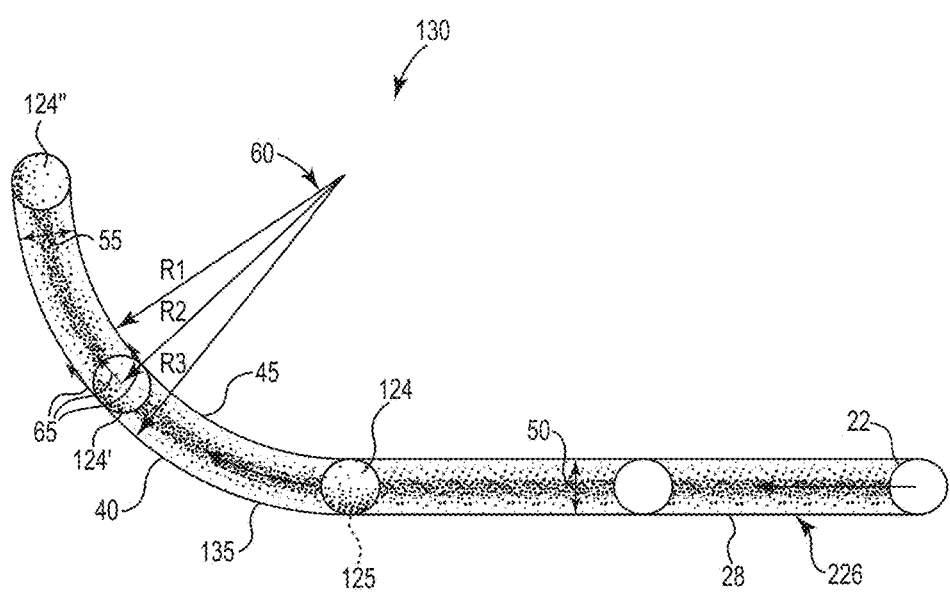
FIG. 4 is a schematic time-lapse representation of an exemplary process to form a consistent waveguide with a symmetric cure profile using the exemplary convolution compensator of FIG. 3A and a uniform laser beam spot profile.
Figure 5:
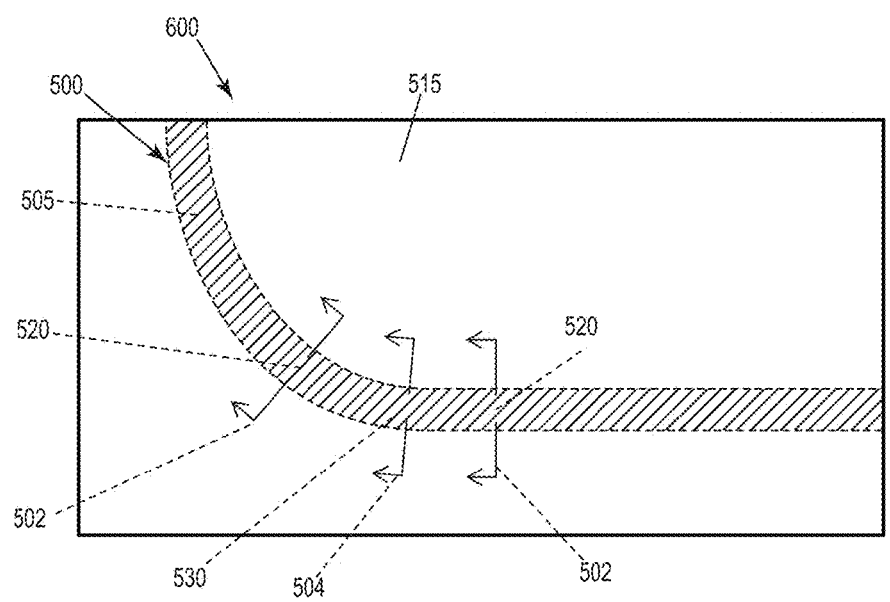
FIG. 5 is a schematic plan-view representation of an exemplary optical board including an exemplary waveguide.
Figure 6:
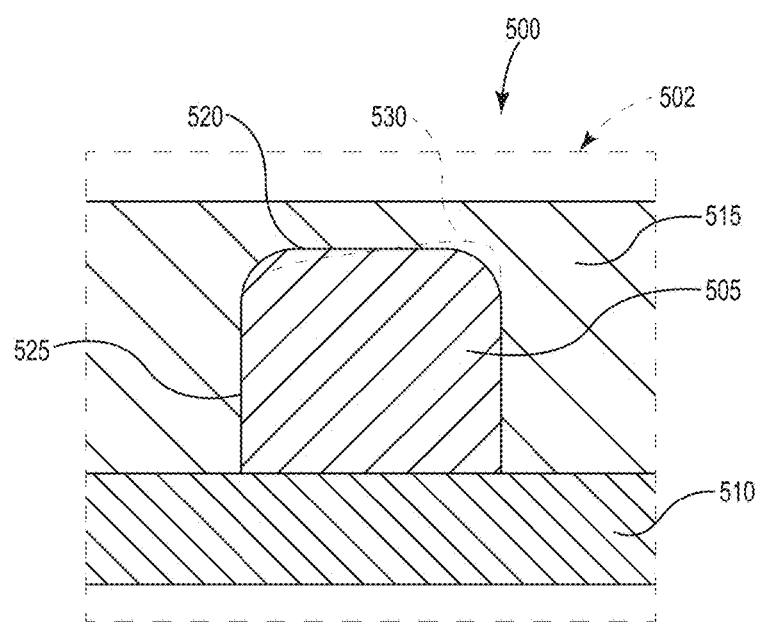
FIG. 6 is a schematic cross-sectional elevation-view representation of the exemplary waveguide of FIG. 5.

Examples to be described include a system with reference to FIGS. 1, 3A, 3B, 8A, 8B, 9A and 9B, exemplary apparatus with reference to FIGS. 5 and 6, exemplary methods with reference to FIGS. 2, 4, 7, and 10, and exemplary spot profiles with reference to FIGS. 11A, 11B, 11C, and 11D. It will be apparent to one skilled in the art that elements from one embodiment may be used in combination with elements of the other embodiments, and that the possible embodiments of such method, system, or apparatus using combinations of features set forth herein is not limited to the specific embodiments shown in the figures and/or described herein. Further, it will be recognized that the size and shape of various elements herein may be modified but still fall within the scope of the present disclosure, although one or more shapes and/or sizes, or types of elements, may be advantageous over others.

Any channel, member, or other physical structure operable to guide electromagnetic radiation and useful to carry an optical signal can be a waveguide. In some cases, a waveguide is formed of glass or a polymer. Glass waveguides can exhibit a practically limited bend radius and be difficult to integrate into dense opto-electrical circuit boards. On the other hand, polymer waveguides may be integrated into high-density opto-electrical printed circuit boards (e.g., PCBs). A polymer waveguide can include a waveguide core layer that is optically transparent surrounded by a cladding layer typically having a lower refractive index than the waveguide core layer. As used herein, the term "waveguide" may refer only to the structure corresponding to the waveguide core layer, which may be formed from a photo-curable material layer.

Any useful polymeric material can be utilized to form the polymeric waveguide. In many embodiments the polymer waveguide is formed of a polyacrylate, polynorbornene or polysiloxane material.

Waveguides may be designed as multimode or singlemode. A multimode waveguide is a low cost option for integrating and coupling to embedded optical PCB channels. Singlemode waveguides enable ultra-low cost photonic integrated circuits, including silicon photonics, devices assembled directly onto small form factor boards.

Singlemode waveguides typically have a smaller core size, or lateral width, than multimode waveguides and typically exhibit less modal dispersion over a distance. Illustrative waveguides have a lateral width range of about 1-100 micrometers. The cross-sectional shape may be square, rectangular, half-dome, Gaussian-like, or another similar shape. In many embodiments, singlemode waveguides have a lateral width range of about 5-15 micrometers. In some embodiments, multimode waveguides have a lateral width range of about 35-100 micrometers.

The photo-curable layer may define a surface, such as a planar surface of a PCB. In many cases, the PCB surface is not perfectly "flat" and may include other features or variations without altering the general planar character of the PCB or the generally planar path of any waveguide formed thereon.

In some cases, waveguides formed on a planar surface may include a linear segment, a non-linear segment, or any number thereof. For each waveguide, the segments may be arranged in series (e.g., adjacent to, contiguous with, or essentially continuous end-to-end). In some embodiments, the waveguide segments are formed according to a bend radius. A non-linear segment may be defined by one or more bend radii, as well as an arc angle (e.g., a right-angle turn being 90 degrees) and a length of the segment (including one or more arc lengths), to form an overall shape of the non-linear segment on the planar surface. An illustrative non-linear segment defined by one bend radius forms a portion of a circle along an arc angle, such as a quarter circle that guides electromagnetic radiation around an arc angle of 90 degree bend. A linear segment may be considered to define a bend radius that is infinite. Non-limiting examples of smaller bend radii include about 15 mm, about 10 mm, about 5 mm, or about 1 mm. Accordingly, larger bend radii may range anywhere from the smaller bend radii to less than infinity.

Although some embodiments of a non-linear segment are single bend radius segments defined by a single bend radius along the length of the segment to achieve an arc angle, many other embodiments are graded bend segments defined by multiple incremental waveguide segments, each defining a bend radius incrementally changed from the bend radius of the previous incremental segment, to achieve the arc angle. In many embodiments, the graded bend segment defines gradually increasing bend radii. Due to having multiple bend radii, a graded bend segment defines a non-circular curve along its length. Non-limiting examples of graded bend segments include an oval section, an ellipse section, a parabola section, a hyperbola section, a sinusoidal section, an S-shape section, among others. In various embodiments, a non-linear segment is defined by multiple bend radii to form a convex segment, a concave segment, or combinations of both (e.g., an S shape).

Using a graded bend segment in a waveguide can improve optical losses versus a single bend radius segment, because the maximum bend mismatch from segment-to-segment can be reduced. In one example, a single bend radius segment defines a single bend radius X to achieve an arc angle and maintains the bend radius along its length wherein $\Delta X$ is the change from the preceding segment's bend radius to X. On the other hand, in another example, a graded bend segment defines the bend radius of the first incremental segment as $Y_1$ and defines an incremental arc angle from the preceding segment's bend radius to Y as $\Delta Y_1$, which is less than $\Delta X$. In addition, $\Delta Y_2, \Delta Y_3, \ldots$ and $\Delta Yn$ represent the bend radius changes between subsequent incremental segments, which are each less than $\Delta X$. Due to the slower change in bend radius along the arc angle, in some embodiments, the graded bend segment has a longer length than the arc length of a single bend radius segment achieving the same arc angle.

In many embodiments, the arc length of each of the plurality of incremental waveguide segments is a fraction of the total length of the graded bend segment, which may be less than about 50%, less than about 33.3%, less than about 25%, less than about 20%, less than about 10%, less than about 5%, or less than about 1%. The arc length of each incremental segment may be the same or different. In one embodiment, the number of incremental segments, the arc length of each, the change in bend radius from segment-to-segment, or a combination thereof is selected to improve optical loss in the waveguide.

Polymer waveguides may be formed at least by photolithography or laser direct writing (LDW). The photolithography process can form high-quality waveguides. However, the process requires high-resolution masks and can be prohibitively expensive and time-intensive. On the other hand, an LDW process does not require masks and can be substantially faster than photolithography for producing waveguides depending on the design of the waveguide layout. An illustrative LDW process for writing a waveguide includes moving or translating an electromagnetic radiation source along a path to trace and to cure selective portions of a photo-curable polymer layer to form the waveguide core structure in the polymer core layer.

Any energy source, with sufficient optical power and intensity for the appropriate wavelength(s) to cure the photo-curable polymer core layer, can be an electromagnetic radiation source for LDW. In many embodiments the electromagnetic radiation source provides a laser beam of concentrated or focused radiation. In some embodiments, the laser beam is an ultraviolet (UV) laser beam.

A laser beam may have a cross-sectional profile, which defines the spot profile of the laser beam. The spot profile is defined as one or more characteristics of a cross-section of the laser beam incidence on a surface, such as that of the photo-curable layer or another object (e.g., convolution compensator). In some embodiments, the cross-sectional profile may be the same or similar as the spot profile (e.g., flat surface and perpendicular incidence). In many embodiments, the spot profile defines an intensity profile, a shape profile, or both, for example. In many embodiments, the shape profile of the laser beam is a circular and the intensity profile is uniform. The uniform intensity profile of the spot profile may be achieved by directing a laser beam, which has a Gaussian intensity beam cross-sectional profile, through a spatial filter (e.g., a pin hole), which allows only the relatively uniform center portion of the Gaussian intensity profile to pass through (i.e., forming a "top hat" profile). In other embodiments, the intensity profile is Gaussian in response to a Gaussian intensity beam cross-sectional profile.

In some applications, a translator directs the beam from the electromagnetic radiation source to trace and to cure the photo-curable layer along a trace. In many embodiments, the translator moves the source in a plane offset and parallel to the planar surface defined by a photo-curable layer of a PCB to trace the waveguide geometry.

The translator may move the laser beam in one dimension parallel to the plane of the PCB to trace a linear waveguide segment (e.g., a waveguide segment with an infinite bend radius). The translator may also move the electromagnetic radiation source in two dimensions parallel to the plane of the PCB to trace a linear or non-linear waveguide segment. In many embodiments, the translator rotates the laser beam in response to the direction of translation to align the laser beam spot profile to the waveguide segment being traced. For example, the laser beam may be rotated continuously while tracing a continuous non-linear waveguide segment. A non-limiting example of aligning the laser beam spot profile to the waveguide segment is rotating the laser beam to align the respective widths of the laser beam spot profile and the waveguide segment as the orientation of the waveguide segment may rotate during a trace (e.g., a non-linear waveguide segment, a change in bend radius, or a change in translation direction in the plane).

The LDW process can provide comparable performance to photolithography for some waveguide segments depending on the waveguide geometry. However, a waveguide segment fabricated with an LDW process and including a finite bend radius can exhibit significantly decreased performance when compared to fabrication by photolithography due to exposure convolution inherent in the LDW process.

Optical losses depend at least partially on the geometry of the waveguide. For example, a waveguide having a bend radius at or near the critical bend radius may experience substantial optical losses. The critical bend radius relates to the critical angle for an optical ray of a signal transmitted through the waveguide along a propagation direction. The critical bend radius for an optical ray describes a radius at or above which the conditions for total internal reflection are satisfied and below which the waveguide may lose at least some signal energy, resulting in optical losses. The bend radius of a waveguide segment influences the angle of incidence for at least some optical rays of the signal. Depending on the critical angle, defined by the difference in the index of refractions of the core and cladding at the waveguide boundary, optical rays with an angle of incidence at or below the critical angle may satisfy the conditions for total internal reflection within the waveguide. On the other hand, angles above the critical angle may expel the optical ray out of the waveguide boundary. Thus, the critical bend radius for a waveguide depends on the particular geometry of the waveguide, such as the segment bend radius or the core width, which can affect optical losses.

Used herein, "convolution" expresses how the shape of one optical function is modified by the other optical function by integration. In one embodiment, a convolution expresses how the intensity distribution of a laser beam spot profile as applied to a photo-curable layer (the first optical function) is modified by the path of tracing a waveguide in the photo-curable layer over time (the second optical function) by integration. In other words, the convolution of these functions expresses the total sum of energy that the waveguide in the photo-curable layer is exposed to from the laser beam spot profile for each point of the waveguide, along its width and length, as the laser beam passes over the photo-curable layer to trace and cure the waveguide. This particular convolution is an example of "exposure convolution," as used herein.

In some cases, exposure convolution can cause a waveguide with a linear and a non-linear segment to have uneven curing between the segments when written by an LDW process. For example, when tracing the non-linear waveguide segment having a finite bend radius, the photo-curable layer along the trace receives uneven total amounts of energy from the laser beam across its width. For example, an inner portion of the waveguide segment receives more total energy than a central portion, which receives more total energy than an outer portion of the waveguide. This is because the laser beam passes more quickly over the outer portion than the central portion, which passes more quickly over the central portion than the inner portion. The total energy received across the waveguide width will be different for the linear waveguide segment and the non-linear waveguide segment, and thus the curing profiles will also be different.

The total energy can be determined by integrating the distribution of the laser beam, directed onto the photo-curable layer during the trace, along the curved path of the laser beam over the time required to write the waveguide.

In various cases, exposure convolution can also cause a waveguide having only a linear waveguide segment or only a non-linear waveguide segment to have non-uniform curing when written by an LDW process. In many embodiments, a laser beam has a spot profile that is symmetric but varies in width along the shape profile of the spot profile (e.g., a circle has a variable width shape profile), varies in intensity across the waveguide width (e.g., a Gaussian beam spot has a variable intensity profile across the width), or both. In such embodiments, a linear waveguide segment being written will receive more total energy in the inner part of the waveguide width (e.g., central portion along the waveguide width) than the outer part of the waveguide width (e.g., side portions near the edges that flank the central portion). The result is a symmetric but uneven cure profile across the width of the waveguide segment corresponding to the variable shape profile of the laser beam spot profile across the spot profile width. This effect would also apply to writing a non-linear waveguide segment, which may be further compounded by the uneven total energy between the inner portion and the outer portion relative to the bend of the non-linear waveguide segment, as described in the foregoing.

Uneven and non-uniform curing may result in uneven refractive index profiles, uneven waveguide cross-sections, or both, which may contribute to optical losses, particularly as the bend radius for a waveguide segment approaches the critical bend radius. In some cases, the decrease in performance is exponentially proportional to the decrease in bend radius. A convolution compensator addresses the effect of exposure convolution by modifying the laser beam used to form the waveguide segment, which can improve cure profile accuracy and improve optical losses.

FIG. 1 is a schematic diagram of an exemplary waveguide laser direct writing (LDW) system 10 capable of compensating for exposure convolution. The LDW system 10 includes an electromagnetic radiation source 12, which is traced along a path 14 relative to a photo-curable layer 16, to provide energy to cure a portion of the photo-curable layer to form a waveguide. In the illustrated embodiment, the photo-curable layer 16 has a planar surface for receiving energy from the source 12. The photo-curable layer 16 may be one layer of an optical PCB, which also has other layers, such as a lower and upper waveguide cladding layer (e.g., FIGS. 5-6).

A convolution compensator 18 is positioned in the path of a laser beam 20 emitted from the source 12 and optionally modifies the laser beam to compensate for exposure convolution. For example, the laser beam 20 defines a spot profile 22, and when the laser beam 20 passes through the convolution compensator 18, at least a portion of the laser beam is modified to define a modified beam portion 23 of the laser beam and to define a modified spot profile 24 different than the spot profile 22.

The spot profiles 22, 24 are two-dimensional cross-sections of the laser beam 20 parallel to the surface of the photo-curable layer 16 in the area wherein the photo-curable layer receives laser beam energy. In the illustrated embodiment, the spot profiles 22, 24 are also orthogonal to the direction of beam propagation.

In various embodiments, the laser beam spot profile 22 is uniform in intensity distribution. In other embodiments, the laser beam spot profile 22 of the electromagnetic radiation source 12 is not uniform in intensity. Non-limiting examples of intensity profiles include a Gaussian distribution, a donut-shaped distribution, a half-dome or semi-circular distribution, or any of these passed through a spatial step filter, among others.

Used herein, "uniform intensity distribution" means less than 2% variation in intensity measured from the maximum intensity throughout the spot profile as received by the photo-curable layer 16.

A translator (not shown) may be coupled to the source 12 to direct the source along the path 14 to trace a waveguide 26 (e.g., the waveguide core) in the photo-curable layer 16 with the laser beam 20. In some embodiments, the translator moves the source 12 in a plane parallel to the surface of the photo-curable layer 16. In many embodiments, the translator is a two-dimensional translator capable of tracing linear and non-linear paths to enable the formation of linear and non-linear segments of the waveguide 26. In one embodiment, the translator is capable of rotating the laser beam 20 to align the laser beam spot profile 22, 24 to the waveguide being traced.

In various embodiments, the convolution compensator 18 modifies an intensity profile, a shape of the spot profile 22, or both. In some embodiments, the convolution compensator 18 modifies at least a portion of the laser beam 20 based on at least one geometric property of a waveguide 26 desired to be written. As described herein in more detail, when the photo-curable layer 16 is cured by the laser beam 20, the LDW system 10 is capable of directing a consistent total amount of energy onto the photo-curable layer 16 while tracing and curing the waveguide 26, in other words compensating for exposure convolution.

In at least one embodiment, the resulting waveguide 26 formed by LDW system 10 has a consistent waveguide cure profile along a length of the waveguide having multiple waveguide segments, even for segments in series having different bend radii. In at least some embodiments, the resulting waveguide 26 formed by LDW system 10 has a uniform waveguide cure profile along the length of each waveguide segment, whether linear or non-linear.

Figure 2:
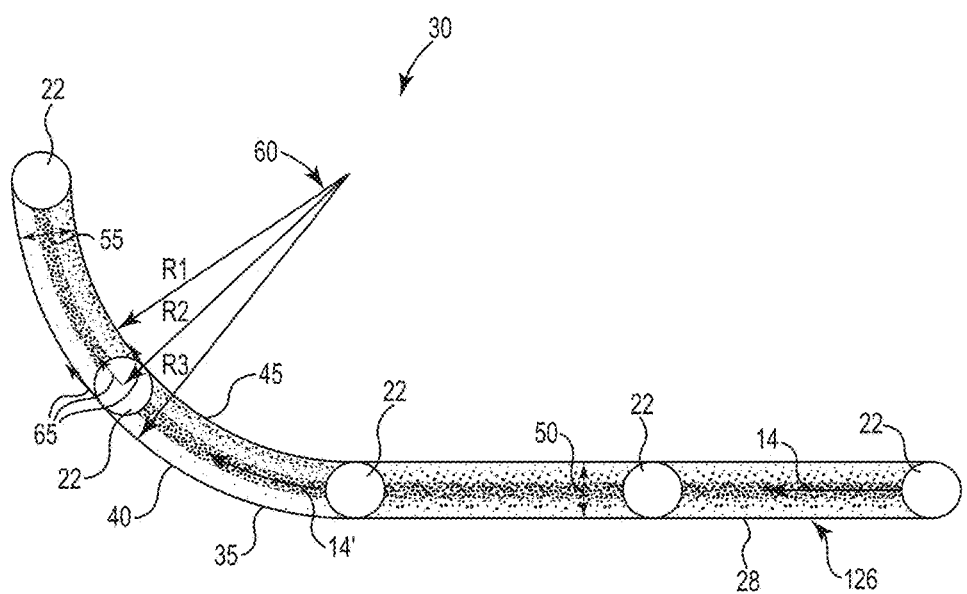
FIG. 2 is a schematic time-lapse representation of a process to form a waveguide.

FIG. 2 is a schematic time-lapse representation of a process 30 to form a waveguide 126 with a waveguide LDW system, such as system 10 (FIG. 1). In the illustrated embodiment, the process 30 begins with tracing a path 14,

14' with a laser beam spot profile 22 at a constant speed over a surface of a photo-curable layer to selectively cure waveguide 126. The laser beam cures a first segment 28 and then a second segment 35 with the same spot profile 22 for both segments. As shown, the spot profile 22 is not modified by the convolution compensator 18 (FIG. 1) between the first segment 28 and the second segment 35 to compensate for differences in geometry. As a result, the second segment 35 has a weighted, asymmetric cure profile and cross-sectional height profile (e.g., similar to cross-sectional shape indicated by top surface 530 of FIG. 6) different than the first segment 28.

The first segment 28 is a linear waveguide segment defining a lateral width 50. The second segment 35 is a non-linear waveguide segment defining a lateral width 55. As shown, the non-linear second segment 35 forms a bend. The non-linear second segment 35 defines an outer edge 40 and an inner edge 45 separated by the width 55. The inner edge 45 is on the inner side of the bend opposite the outer edge 40 on the outer side.

As illustrated, the widths 50, 55 are the same and consistent throughout the length of each respective segment. In other embodiments (not shown), the widths may be different between the segments, throughout a segment, or both.

The first segment 28 and the second segment 35 each have a different bend radius. As shown, the bend radius for the first segment 28 is infinite, which forms a linear segment. On the other hand, the non-linear second segment 35 has at least one bend radius that is finite.

In the illustrated embodiment, the non-linear portion of the path 14' comprises a single bend radius segment. However, the non-linear portion of the path 14' may have a plurality of bend radii, such as a graded bend segment described herein elsewhere.

Bend radii for a segment are defined between an origin point outside of the segment and a corresponding line parallel to the non-linear portion of the path 14'. Because each segment has a width 55, a segment will define more than one bend radius and will comprise a range of bend radii bounded by the bend radius R1 and the bend radius R3. As illustrated, the first radius R1 is defined from an origin point to a line along the inner edge 45, the second radius R2 is defined from the same origin point to a line following the path 14' along the center of the width 55, and the third radius R3 is defined from the same origin point to a line along the outer edge 40. In the illustrated embodiment, radii R1 and R3 are offset by half of the width 55 of the segment 35 from R2. As used herein, bend radius 60 refers to the radius R2 along the path 14' at the center of the width.

The process 30 forms the first and second segments 28, 35 in a series arrangement. As shown, the laser beam with spot profile 22 traces and cures the linear first segment 28 and thereafter traces and cures the non-linear second segment 35. In other words the segments 28, 35 are arranged adjacent to, contiguous with, or essentially continuous end-to-end to each other. In other embodiments (not shown), the segments may not be adjacent, may be formed in different order, or both.

The spot profile 22 may be of any suitable shape described herein in more detail with respect to FIG. 11. In the illustrated embodiment, the laser beam spot profile 22 defines a circular shape and a uniform intensity profile. In other embodiments, the spot profile 22 defines a non-circular shape, a non-uniform intensity profile, or both.

When the writing process 30 translates the laser beam with this spot profile 22 at a constant speed along the linear and non-linear portions of the path 14, 14', a consistent total energy amount is delivered via exposure convolution along the path 14, 14' over the first segment 28. As a result, the linear first segment 28 has a symmetric first cure profile throughout the length of the segment along the waveguide propagation direction and throughout the width of the segment transverse to the waveguide propagation direction.

On the other hand, the non-linear second segment 35 has an asymmetric second cure profile different than the first cure profile. As shown, the cure profile for the second segment 35 defines an increasing cure gradient along the width 55 from the outer edge 40 to the inner edge 45. In other words, the second cure profile is weight-shifted, or has a center of gravity that is shifted, closer to the inner edge 45, because different portions of the laser beam travel at different angular speeds 65 depending on the distance to the origin point (e.g., bend radius). As shown, a portion of the laser beam directed nearer the outer edge 40 moves more quickly than a portion of the laser beam directed nearer the inner edge 45. Thus, an uneven total energy amount is delivered via exposure convolution to the non-linear second segment 35, at least along the width 55.

The cure profile of the first segment 28 is different than the cure profile of the second segment 35, which has bend radius 60 different than the bend radius of the first segment 28. In many cases, the inconsistency between cure profiles may contribute to optical losses due to refractive index mismatching during propagation, particularly between segments having different bend radii and in segments having a bend radii less than the critical bend radius.

FIGS. 3A and 3B are schematic diagrams of an exemplary laser beam 120 with a uniform spot profile 22 and an exemplary convolution compensator 118 in position to modify the beam of corresponding cross-sectional profiles 22, 182, 124. As illustrated, the laser beam 120 includes a first portion 21 having spot profile 22, which is directed into the convolution compensator 118. The laser beam 120 is passed through the convolution compensator 118 and at least a portion 123 of the laser beam is modified into modified spot profile 124.

A user may determine desired or target curing profiles for the waveguide for fabrication with the dynamically reconfigurable convolution compensator 118. In response, the intensity profile can be selectively modified. As illustrated, the spot profile 22 has a circular shape profile and a uniform intensity profile, although other shape or intensity profiles may be used (e.g., rounded rectangle). The convolution compensator 118 modifies the laser beam 120 to address any undesired effects of exposure convolution in response to a geometric characteristic, a laser beam spot profile characteristic, or both, for example. In many embodiments, the laser beam 120 is modified in response to at least one geometric property of the waveguide segment to be written, such as the bend radius of the segment, the width of the segment, the trace speed, the intensity of the laser beam, and the shape of the spot profile, among others. In some embodiments, the laser beam 120 is modified in response to at least one characteristic of the laser beam spot profile, such as a width of the spot profile, a shape profile along the width, and an intensity profile along the width, among others.

At trace speed, the convolution compensator 118 is operable to modify the laser beam 120 as needed in "real time" during a waveguide writing process, for example from the bend radius of the first segment 28 to the bend radius 60 of the second segment 35. In many embodiments, the convolution compensator 118 is operable to modify the laser beam 120 in "real time" for graded bend segments having multiple incremental waveguide segments that are each a fraction of the total length of the graded bend segment and require a different beam modification for each incremental segment. As used herein, "real time" relates to the operable speed and responsiveness of the LDW system being sufficient to compensate for exposure convolution at trace speed.

The speed of translation in the waveguide writing process depends on many factors to fabricate a desirable waveguide. In an exemplary embodiment, the trace speed of the beam spot is about 8 mm/s to about 12 mm/s. In other embodiments, the trace speed is less than about 8 mm/s or, alternatively, greater than about 12 mm/s. The trace speed may also vary during the waveguide writing process depending on the desired characteristics of the waveguide.

In many embodiments, the convolution compensator 118 is further operable to dynamically modify the laser beam 120 to write segments having different bend radii for a continuous waveguide. In various embodiments, the laser beam 120 with the modified intensity profile 124 is directed onto a photo-curable layer to write a non-linear waveguide segment based on at least the bend radius of the segment.

In some cases, the resulting non-linear waveguide segment has a symmetric cure profile. In various cases, the non-linear waveguide has a cure profile that substantially matches the cure profile of the linear waveguide segment written with the laser beam 120 having the spot profile 22. In many embodiments, when cure profiles have been substantially matched, the resulting waveguide segments exhibit substantially matching heights, refractive index profiles, or other waveguide segment characteristics.

Used herein, "substantially matching cure profiles" means less than about 2% variation in the amount of curing energy delivered to a corresponding point along the cross-sectional width of each waveguide segment being written.

In the illustrated embodiment, the modified intensity spot profile 124 is a simple linear gradient from an outer side 140 to an opposing inner side 145 suited for writing a single-bend radius, non-linear waveguide segment wherein the outer side 140 passes more quickly over a photo-curable layer than the inner side 145 while tracing. In other words, the convolution compensator 118 applies a decreasing intensity gradient from the outer side 140 to the inner side 145 to the intensity profile to modify spot profile 22 into modified spot profile 124.

The exemplary convolution compensator 118 includes a reconfigurable filter 180 operable to modify the intensity profile of the laser beam spot profile 22. The filter 180 may be configured by a user to be responsive to transitions between segments having different geometric properties, such as different bend radii, during an LDW writing process.

Various embodiments comprise a reconfigurable filter 180 capable of transitioning gradually from one graded density profile 182. In an example embodiment, the reconfigurable filter 180 comprises a liquid crystal array capable of being reconfigured continuously from profile-to-profile. In other various embodiments, the reconfigurable filter 180 is capable of being reconfigured discretely from profile-to-profile marked by more abrupt transitions between profiles. However, it is to be understood that in some cases a plurality of intermediate profiles may be used such that each individual discrete transition is small enough to be considered continuous for purposes of the laser direct writing particular application.

In some embodiments, the reconfigurable filter 180 is a neutral density filter. In various embodiments, the neutral density filter has a graded density profile 182 from one end to an opposite end to modify the laser beam 120 from a uniform spot profile 22 to the graded intensity profile 124.

However, any suitable gradient profile capable of compensating for exposure convolution may be used. In one embodiment, the graded density profile 180 decreases in the direction that the intensity gradient of the modified intensity profile 124 increases.

In another example embodiment, the reconfigurable filter 180 is reconfigured by swapping neutral density filters with different density gradients corresponding to different bend radii. In one embodiment, the reconfigurable filter 180 swaps out all neutral density filters enabling the convolution compensator 118 to selectively modify or not modify the laser beam 120.

In some embodiments, as the writing process transitions between writing a first waveguide segment and writing a second waveguide segment having different bend radii, the convolution compensator 118 concurrently transitions from one configuration to another configuration while the laser beam 120 continues to move at a constant speed. In some cases, the convolution compensator 118 gradually modifies the laser beam 120 between the bend radii in a continuous manner, for example, utilizing a reconfigurable filter 180 capable of transitioning gradually from profile-to-profile.

In other cases, wherein the convolution compensator 118 uses discrete states (e.g., not continuous, such as physically swapping filters), the waveguide may include a transition waveguide segment 125 (FIG. 4) between the first and second waveguide segments described herein in more detail.

FIG. 4 is a schematic time-lapse representation of an exemplary process 130 to form a consistent waveguide 226 with a symmetric cure profile for use with a convolution compensator (e.g., 118 of FIG. 3A) and a uniform laser beam spot profile 22. Many elements shown in FIG. 4 are the same elements shown in FIG. 2 and are numbered the same.

In the illustrated embodiment, the process 130 begins with tracing the path with a laser beam spot profile 22 at a constant speed over a surface of a photo-curable layer to selectively cure waveguide 226. The laser beam with spot profile 22 cures a first segment 28 having width 50. Then, the laser beam with modified spot profiles 124, 124', 124" different than spot profile 22 cures a second segment 135 having outer edge 40 and inner edge 45 separated by width 55.

As illustrated, the modified spot profiles 124, 124', 124" have the same intensity and shape profiles. In many embodiments, the profiles are the same when the second segment 135 has a single bend radius. In other embodiments, the modified spot profiles 124, 124', 124" are each different, for example, when the second segment 135 is a graded bend segment defined by multiple incremental segments and corresponding bend radii. Each spot profile depends on the corresponding bend radius.

The second segment 135 has a different bend radius than the first segment 28. As shown, the second segment 135 is non-linear in the form of a bend defined by bend radius 60, so portions of the laser beam travel at different speeds 65 (e.g., more quickly over the outer edge segment portions than the inner edge segment portions).

The modified spot profile 124 compensates for exposure convolution while tracing based on at least one geometric property of the second segment 135, such as the bend radius 60. As shown, the modified spot profile 124 includes a non-uniform intensity profile that increases from one side directed at inner edge segment portions to an opposing side directed at outer edge segment portions. The shape of the modified spot profile 124 retains a circular shape.

As a result of the process 130, the second segment 135 has a cure profile that is desired and substantially matches the cure profile of the first segment 28, which is symmetric and may improve optical losses in the waveguide 226 relative to waveguide 126 (FIG. 2). In some embodiments, the waveguide 226 may include a transition waveguide segment 125 between the first and second segments 28, 135.

In various embodiments, the transition waveguide segment 125 is formed by a non-continuous or discrete modification of the laser beam used to cure the waveguide. Generally, the longer the transition time or distance between configurations of the convolution compensator, the longer the transition waveguide segment 125 will be.

In many embodiments, the transition waveguide segment 125 has a linear length or arc length that is less than 10%, less than 5%, less than 1%, less than 0.5%, or less than 0.1% of the length of the first or second waveguide segment.

In some embodiments, the characteristics of the transition waveguide segment 125, including physical dimensions, do not substantially impact the performance of the waveguide between the first and second waveguide segments. For example, the transition waveguide segment 125 may have a sufficiently short length or sufficiently small variation from the first and second segments 28, 135.

A waveguide, such as exemplary waveguide 500 having a convolution-compensated cure profile as shown in FIGS. 5-6, may be formed at least partly by process 130, or any other process described herein. The waveguide 500 may be utilized in an optical board, such as exemplary optical board 600 in FIG. 5. In turn, the optical board may be utilized to form optical circuits or assemblies for various applications. In particular, FIG. 5 shows a plan view of the optical board 600 showing the waveguide 500 extending from one edge to another edge of the board in a schematic representation. Alternatively, FIG. 5 can be described as a partial view of an optical portion of a board 600 showing only a portion of a waveguide 500, and the board 600 may include other waveguides or even non-optical components (e.g., electrical or electronic). From an elevation viewpoint, FIG. 6 shows the waveguide 500 along a cross-section 502.

In the illustrated embodiment, the waveguide 500 extends through the optical board 600 and includes a first segment having a first bend radius to a second segment having a second bend radius, similar to the waveguide 226 shown in FIG. 4. In many embodiments, the cross-sectional profiles of the first and second segments may substantially match cross-section 502 shown in FIG. 6.

As shown along cross-section 502, the waveguide 500 includes a waveguide core 505, lower waveguide cladding 510, and upper waveguide cladding 515. In an exemplary LDW process, a photo-curable layer may be disposed on the lower cladding 510 and selectively cured via writing to form the waveguide core 505. The uncured portion of the photo-curable layer may be removed. Then, the upper cladding 515 may be formed over the waveguide core 505 to surround the core with cladding. The waveguide core 505 defines a waveguide top or top surface 520 (e.g., upper surface) and one or more waveguide sides 525, both being adjacent to the upper waveguide cladding 515. The waveguide 500 may be described as a written waveguide.

In many embodiments, the waveguide core 505 has a different refractive index than the cladding 510, 515. As shown, the waveguide core 505 has a uniform refractive index profile across its width.

In the embodiment shown, the top surface 520 of the core 505 may not be substantially uniform in height. The top surface 520 may be described as non-planar. Thus, the height may vary along the top surface 520 in an amount greater than or equal to about 0.1%, to about 1%, to about 10%, to about 25%, or to about 50% of the maximum height of the core 505. In various embodiments, the height varies along the top surface 520 in an amount preferably less than about 1%, less than about 5%, less than about 10%, or less than about 25% of the maximum height of the core 505.

In many illustrative embodiments, a written waveguide 500 may exhibit characteristic markers of laser writing, which may distinguish the written waveguide from a waveguide formed by photolithography. Non-limiting examples include markers related to cross-sectional shape, for example, some of which are described herein. In at least some illustrative embodiments, the top surface 520 may include a non-uniform height portion and an optional uniform height portion. The non-uniform height portion may be adjacent to a uniform height portion. The non-uniform height portion may be adjacent to a side of the core 505 of the waveguide (e.g., waveguide side(s) 525).

In the illustrated embodiment, the top surface 520 includes a substantially uniform height center portion and two non-uniform height outer portions, for example. The top surface 520 may define a maximum height. In at least some illustrative embodiments, the top surface 520 defines a maximum height toward the center of the cross-section, and the top surface 520 reduces in height proximal, or adjacent, to the one or more sides 525. The reduction in height may define a rounded edge, for example. In other words, the top surface 520 may define a height profile, for the waveguide 500 or any segment of the waveguide, which may be described as extending along a width of the waveguide 500 or any segment of the waveguide.

A convolution compensator, such as any described herein, may be utilized to influence the cross-sectional shape of the waveguide 500. For example, the non-uniform portion, or reduction in height, may be the result of curing with a laser beam having an intensity profile with higher intensity toward the center of the profile and a lower intensity toward the periphery. In at least one embodiment, the waveguide core layer may have been cured with a laser beam spot profile having a rounded rectangular shape profile (e.g., spot profile 650 of FIG. 11B) or a circular shape with modified intensity profile (e.g., spot profile 600 of FIG. 11A). In alternative embodiments (not shown), the waveguide core 505 has another non-linear shape, such as a half-dome or a Gaussian-like curve, for example, which may be caused by curing with a circular laser beam spot profile (e.g., spot profile 22 of FIG. 3B).

In many illustrative embodiments, the waveguide sides 525 may indicate a written waveguide versus a photolithography-formed waveguide. For example, the waveguide sides 525 may define a width. The width may define a width profile, which may be described as extending along a height of the waveguide 500 or any segment of the waveguide. In many embodiments, the width profile may be substantially uniform. In other words, the sides 525 may be substantially parallel. The parallel sides may be formed due to the collimated nature of the electromagnetic radiation from a laser beam. This may differ from a waveguide formed by photolithography, which may include sloped sides due to diffraction effects of light passing a photolithography mask before being absorbed into the photo-curable layer.

Used herein, "substantially parallel" means the variation in distance between the sides 505 along the height is less than about 0.1%, less than about 1%, or less than about 5% of a maximum width between the sides. In some cases, the maximum width is located at the base of the waveguide core 505 adjacent to the lower cladding 510.

In some illustrative embodiments, a transition waveguide segment may indicate a written waveguide, as described with respect to FIG. 4, for example. The transition waveguide segment may be disposed between two main segments (e.g., first segment 28 and second segment 135 of FIG. 4). Perhaps as best shown in FIG. 5, a transition waveguide segment may be located in the waveguide 500 along a cross-section 504. The transition waveguide segment may include a non-uniform top or non-uniform top surface 530 (e.g., upper surface) different than the uniform top surface 520 of corresponding main segments. In other words, the cross-sectional profile of the transition waveguide segment may differ from the cross-sectional profile of the main segments, such as the first segment or the second segment described herein elsewhere. This may differ from a waveguide formed by photolithography, which may utilize a substantially stationary, uniform, and consistent light-source to cure the photo-curable layer.

In the illustrated embodiment, the top surface 530 of the transition waveguide segment may resemble the top surface 520 modified by exposure convolution or resemble an artifact of transitioning the convolution compensator, transitioning the path of the laser beam, or both, for example. In many embodiments, the variation between the top surface of the transition waveguide segment and the top surfaces of the main segments is less than the variation would be between main segments having different bend radii formed by LDW without convolution compensation, which may be beneficial to improve optical loss.

Figure 7:
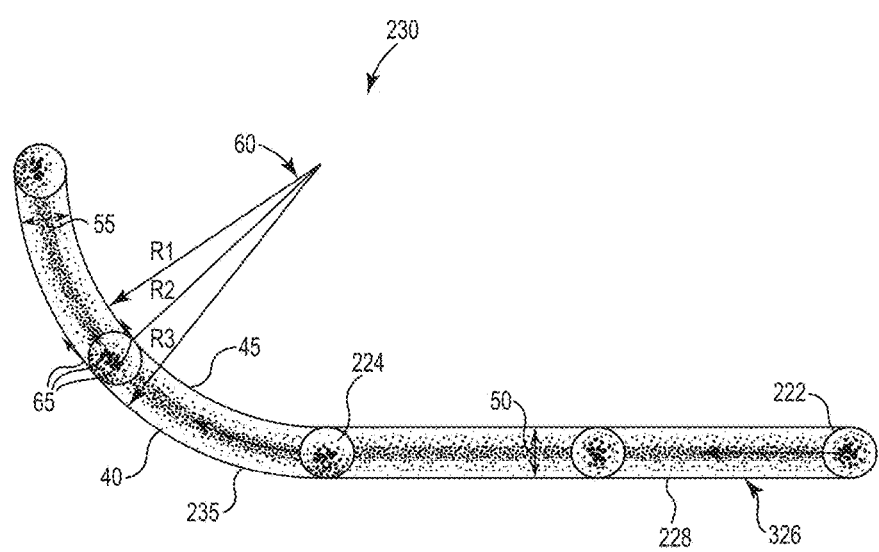
FIG. 7 is a schematic time-lapse representation of an exemplary process to form a consistent waveguide with a symmetric cure profile using the exemplary convolution compensator of FIG. 3A and a non-uniform laser beam spot profile.

An exemplary waveguide may be formed utilizing process 230. As shown in FIG. 7, a schematic time-lapse representation of an exemplary process 230 may form a consistent waveguide 326 with a non-uniform cure profile using the exemplary convolution compensator (e.g., 118 of FIG. 3A) and a non-uniform laser beam spot profile 222. Many elements shown are the same elements shown in FIG. 4 and are numbered the same. However, FIG. 7 differs in that the spot profile 222 used to cure the first segment 228 of the waveguide 326 has a non-uniform intensity profile, which is then modified by a convolution compensator to cure the second segment 235. Although the spot profile 222 is not uniform, the convolution compensation steps are the same as used in process 130.

As shown, the spot profile 222 is circular and has a Gaussian intensity profile decreasing in intensity from the center of the circle toward the perimeter. In some cases, the Gaussian intensity profile may be beneficial in forming a graded index polymer waveguide by LDW, such as in a photoaddressing process or others, which may improve modal dispersion and improve confinement of signal energy.

Exemplary process 230 begins with tracing the path with a laser beam spot profile 222 at a constant speed over a surface of a photo-curable layer to selectively cure waveguide 326. The laser beam with spot profile 222 cures a first segment 228 having width 50. Then, the laser beam with modified spot profile 224 different than spot profile 222 cures a second segment 235 having outer edge 40 and inner edge 45 separated by width 55.

The second segment 235 has a different bend radius than the first segment 228. As shown, the second segment 235 is non-linear in the form of a bend defined by bend radius 60, so portions of the laser beam travel at different speeds 65 (e.g., more quickly over the outer edge segment portions than the inner edge segment portions).

The modified spot profile 224 compensates for exposure convolution while tracing based on at least one geometric property of the second segment 235, such as the bend radius 60. As shown, the modified spot profile 224 includes a non-uniform intensity profile that resembles a graded intensity profile that increases from one side directed at inner edge segment portions to an opposing side directed at outer edge segment portions, which is applied to the Gaussian intensity profile of spot profile 222. The shape of the modified spot profile 224 retains a circular shape.

As a result of the process 230, the second segment 235 has a cure profile that is desired and substantially matches the cure profile of the first segment 228, which has a Gaussian distribution along the width 55 and may improve optical losses in the waveguide 326 relative to waveguide 126 (FIG. 2). In some embodiments, the waveguide 326 may include a transition waveguide segment between the first and second segments 228, 235 similar to the transition waveguide segment 125 described with respect to FIG. 4.

Figure 8A:
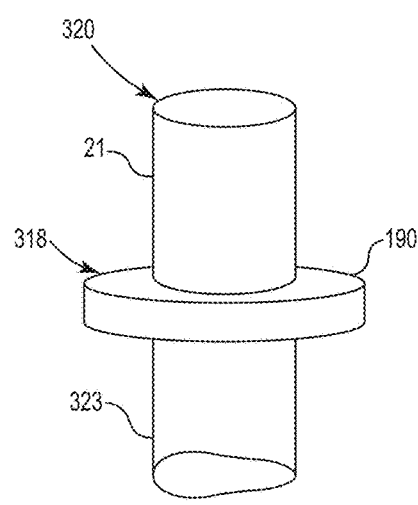
FIGS. 8A and 8B are schematic diagrams of a uniform laser beam, another exemplary convolution compensator in position to modify the beam, and related cross-sections.
Figure 8B:
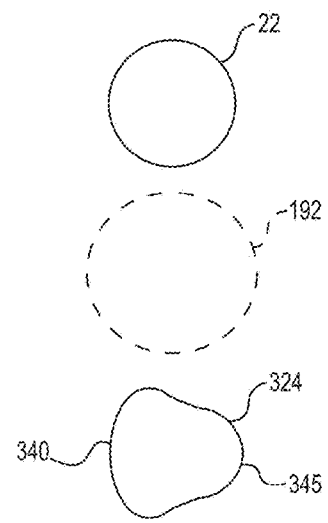

FIGS. 8A and 8B are schematic diagrams of an exemplary uniform laser beam 320 and another exemplary convolution compensator 318 in position to modify the beam and of corresponding cross-sectional profiles 22, 192, 324. Convolution compensator 318 is similar to convolution compensator 118. However, the convolution compensator 318 is configured to modify the shape of the spot profile 22, whereas the convolution compensator 118 of FIG. 3 is configured to modify the intensity profile of the spot profile 22.

In a manner similar to that described with respect to convolution compensator 118, a laser beam 320 includes a first portion 21 having spot profile 22, which is directed into the convolution compensator 318 and at least a portion 323 of the laser beam is modified to have a modified spot profile 324. However, the spot profile 22 may be modified from a circular shape into a different, non-circular shape, shown as modified spot profile 324. In the illustrated embodiment, the modified shape of the spot profile 324 resembles a gradual taper that narrows from an outer side 340 to an opposing inner side 345, which is applied to the circular shape of the spot profile 22. In other words, the convolution compensator 318 as illustrated applies a taper to the shape of the spot profile 22.

The exemplary convolution compensator 318 includes an adaptive lens 190 having a cross-sectional area 192 larger than the spot profile 22 and operable to modify the shape of the laser beam spot profile 22. The lens 190 may be configured by a user to be responsive to transitions between segments having different geometric properties, such as different bend radii, during an LDW writing process. In some embodiments, the adaptive lens 190 is an optofluidic lens. However, any suitable beamforming lens capable of compensating for exposure convolution may be used.

In various embodiments, the adaptive lens 190 is adaptable to various waveguide segment geometries by applying any number of electrical signals to the lens. The electrical signals may be continuously variable or discrete, for example. In one embodiment, the adaptive lens 190 is adaptable to pass a laser beam without reshaping the spot profile 22, enabling the convolution compensator 318 to selectively modify or not modify the laser beam 320.

In some embodiments, the transition of the convolution compensator 318 is discrete and not continuous from state-to-state and may result in the formation of a transition waveguide segment similar to transition waveguide segment 125 (FIG. 4).

Figure 9A:
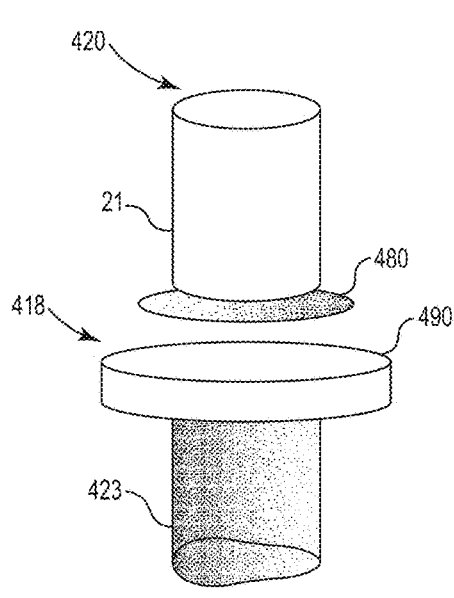
FIGS. 9A and 9B are schematic diagrams of a uniform laser beam, a further exemplary convolution compensator in position to modify the beam, and related cross-sections.
Figure 9B:
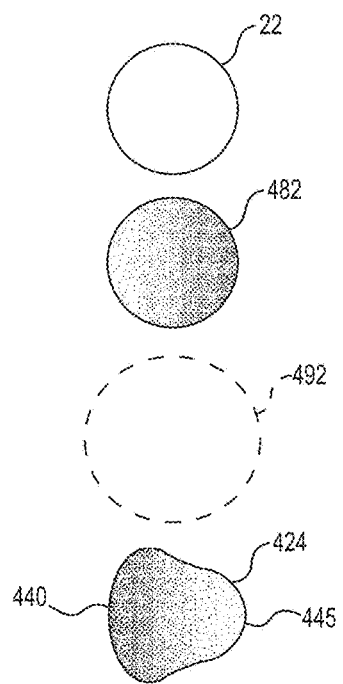

FIGS. 9A and 9B are a schematic diagrams of an exemplary uniform laser beam 420 and a further exemplary convolution compensator 418 in position to modify the beam and of corresponding cross-sectional profiles 22, 482,

492, 424. Similar to FIGS. 3A and 3B and 8A and 8B, a laser beam 420 includes a first portion 21 having spot profile 22, which is directed into the convolution compensator 418 and at least a portion 423 of the laser beam is modified to have a modified spot profile 424. However, the convolution compensator 418 is capable of modifying the intensity profile, the shape, or both of the spot profile 22 in a manner similar to those described with respect to convolution compensators 118 and 318.

In the illustrated embodiment, the shape profile of the modified spot profile 424 resembles a gradual taper that narrows from an outer side 440 to an opposing inner side 445, which is applied to the circular shape of the spot profile 22 being modified to have a graded intensity profile. In other words, the convolution compensator 418 applies a taper and an intensity gradient to spot profile 22.

In various embodiments, the convolution compensator 418 provides a modified spot profile 424 that is narrower at the inner side 445 than outer side 440 but does not resemble the shape profile of spot profile 22. In one example, the convolution compensator 418 modifies a circular shape to a rounded trapezoid shape. In another example, the convolution compensator 418 modifies a rounded rectangle to a rotated, rounded rectangle.

In some embodiments, the convolution compensator 418 includes a reconfigurable filter 480 having a graded density profile 482 (similar to reconfigurable filter 180 and profile 182) and an adaptive lens 490 having a cross-sectional area 492 (similar to adaptive lens 190 and area 192). Utilizing both the filter 480 and the lens 490 can increase the flexibility and performance of the convolution compensator 418. In one example, the convolution compensator 418 is capable of compensating for even smaller bend radii or more rapid changes in bend radii (e.g., quicker transitions) than a convolution compensator having only one of the filter 480 and the lens 490.

The convolution compensator 418 can selectively modify the intensity profile, the shape, or a combination thereof. Such modifications can also be concurrent, staggered, or a combination thereof. In one embodiment, the convolution compensator 418 cooperatively applies filter 480 to modify the intensity profile and applies the lens 490 to modify the shape of the spot profile 22.

In one example, the transition of the filter 480, the lens 490, or both is discrete and not continuous from state-to-state and may result in the formation of a transition waveguide segment similar to transition waveguide segment 125 (FIG. 4). However, the convolution compensator 418 may transition more gradually between segments by staggering the transition of the filter 480 and the lens 490 for example.

In another example, the graded density profile 482 can be less accentuated than the graded density profile 182 (FIG. 3B) to achieve the same exposure convolution compensation by concurrently applying a taper with lens 490 to the spot profile 22, which itself can be less accentuated than the taper provided by the adaptive lens 190 (FIG. 8A) to achieve the equivalent convolution compensation.

Figure 10:
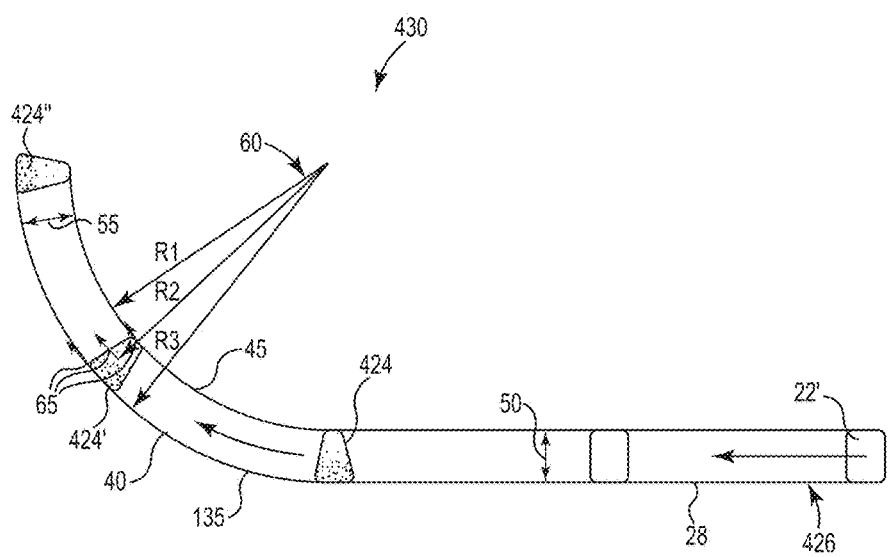
FIG. 10 is a schematic time-lapse representation of an exemplary process to form a consistent waveguide with a symmetric cure profile using the exemplary convolution compensator of FIG. 9A and a uniform laser beam spot profile.
Figure 11A:
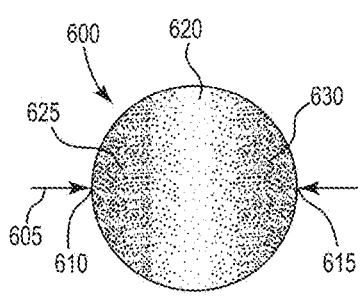
FIGS. 11A, 11B, 11C, and 11D are schematic representations of exemplary beam cross-sectional shapes.
Figure 11B:
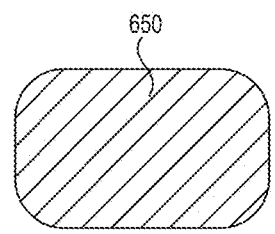
Figure 11C:
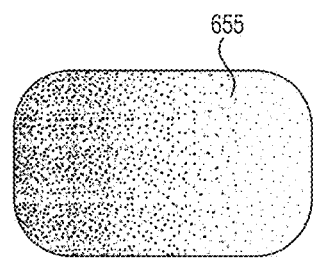
Figure 11D:
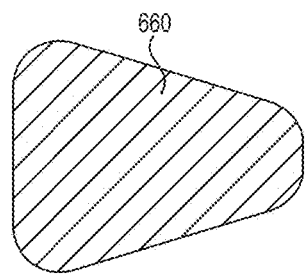

An exemplary waveguide may also be formed utilizing process 430. As shown in FIG. 10, a schematic time-lapse representation of an exemplary process 430 may form a consistent waveguide 426 with a uniform cure profile using a convolution compensator (e.g., 418) and a uniform laser beam spot profile 22' having a rounded rectangular shape. Many elements shown are the same elements shown in FIGS. 4 and 7 and are numbered the same.

In the illustrated embodiment, the process 430 begins with tracing the path with a laser beam spot profile 22' at a constant speed over a surface of a photo-curable layer to selectively cure waveguide 426. The laser beam with spot profile 22' cures a first segment 28 having width 50. Then, the laser beam with a modified spot profile 424, 424', 424" different than spot profile 22' cures a second segment 135 having outer edge 40 and inner edge 45 separated by width 55. Both the first segment 28 and the second segment 135 have substantially uniform cure profiles.

As can be seen, the spot profile 22' has a rounded-rectangular shape profile, which may have been modified by a convolution compensator from a circular shape profile to compensate for exposure convolution during tracing based on the shape or intensity of the laser beam spot profile. In the illustrated embodiment, the initial modified spot profile 424 is rotated one or more times as illustrated by modified spot profiles 424' and 424" while tracing the second segment 135. In many embodiments, the modified spot profile 424 is rotated by a translator. In other embodiments, the modified spot profile 424 is apparently rotated by a convolution compensator by modifying the shape profile to simulate rotation by the translator.

As shown, the second segment 135 has a different bend radius than the first segment 28. As shown, the second segment 135 is non-linear in the form of a bend defined by bend radius 60, so portions of the laser beam travel at different speeds 65 (e.g., more quickly over the outer edge segment portions than the inner edge segment portions).

The modified spot profile 424 compensates for exposure convolution while tracing based on at least one geometric property of the second segment 135, such as the bend radius 60. As shown, the modified spot profile 424 defines a non-uniform intensity profile that decreases from the first side to the opposing second side and has a modified shape profile that resembles a gradual taper applied to the rounded-rectangular spot profile 22' that narrows from the first side to the opposing second side.

As a result of the process 430, the second segment 135 has a cure profile that is desired and substantially matches the cure profile of the first segment 28, which is uniform and may improve optical losses in the waveguide 426 relative to waveguide 126 (FIG. 2). In some embodiments, the waveguide 426 may include a transition waveguide segment between the first and second segments 28, 135 similar to the transition waveguide segment 125 described with respect to FIG. 4, which may have more gradual transitions than transition waveguide segment 125.

FIGS. 11A, 11B, 11C, and 11D are schematic representations of exemplary laser beam spot profiles. In some embodiments, the spot profiles 600, 650, 655, 660 represent spot profiles of a laser beam modified by a convolution compensator capable of modifying the intensity profile, the shape profile, or both to achieve a substantially uniform cure profile when writing a waveguide. In other embodiments, the spot profiles 600, 650, 655, 660 represent the beam cross-sectional profile prior to modification by a convolution compensator. In yet further embodiments, each of the spot profiles 600, 650, 655, 660 may be further modified by a convolution compensator, for example, to move from writing a linear waveguide segment to a non-linear waveguide segment or vice versa.

As used herein, "substantially uniform cure profile" means less than about 2% variation in the amount of curing energy delivered along the cross-sectional width of the waveguide segment being written.

Intensity profiles may be uniform or uneven, such as a gradient. Non-limiting examples of spot profile shapes include: a closed conic section, an oval, a polygon, any rounded corner versions thereof, any symmetric versions thereof, any asymmetric versions thereof, any combination of linear or non-linear lines to form an outer perimeter, any tapered versions thereof, any rotations thereof, or any combinations thereof. A polygon may be a triangle, a quadrilateral, a pentagon, a hexagon, and so forth. A symmetric version of a quadrilateral may be a square or a rectangle, for example, whereas an asymmetric version may be a trapezoid. An example of a symmetric version of a closed conic section may be a circle or an ellipse.

As illustrated, spot profile 600 includes a width 605 extending from a first side or outer side 610 to a second or inner side 615 opposite the first side, and a central portion 620 between a first outer portion 625 and a second outer portion 630 opposite the first outer portion. The shape profile is variable along the width (e.g., uneven or non-uniform), and the intensity profile is a variable gradient across the width. For example, the circular shape has less area in each outer portion per unit width than in the central portion (e.g., uneven across the width in area), which would result in an uneven cure profile due to the shape alone. However, the intensity of the central portion 620 is less than the intensity of the outer portions 625, 630, which compensates for the effects of the variable shape profile. Thus, in some cases, the spot profile 600 is useful to trace a linear waveguide segment, wherein the variable shape and intensity profiles balance along the width 605 to address the effects of exposure convolution and produce a substantially uniform cure profile.

Turning to spot profile 650, the shape profile is a rounded rectangle, similar to spot profile 22' (FIG. 10). The shape profile of a rectangle is more uniform or even along the width (e.g., less variable) than the other spot profile 600 and may be substantially uniform. In addition, the intensity gradient is more uniform than the other spot profile 600 and may be substantially uniform. Similar to spot profile 600, the spot profile 650 may be useful to trace a linear waveguide segment wherein the substantially uniform shape and intensity profiles balance along the width to address the effects of exposure convolution and produce a substantially uniform cure profile.

Referring now to spot profile 655, the shape profile is a rounded rectangle, similar to the other spot profile 650, which would result in an uneven cure profile for a non-linear waveguide segment. However, the intensity gradient is more uneven than spot profile 650. As shown, the intensity gradient is higher in a first outer portion than the central portion and higher in the central portion than a second outer portion opposite the first outer portion. In contrast to the other spot profiles 600, 650, the spot profile 655 may be useful to trace a non-linear waveguide segment, wherein the substantially uniform shape profile and variable intensity profile balance along the width to address the effects of exposure convolution and produce a substantially uniform cure profile.

With regard to spot profile 660, the intensity gradient is substantially uniform along the width similar to spot profile 650. However, the shape profile is variable. As shown, the shape profile is a tapered, rounded rectangle (e.g., a rounded trapezoid) resembling a taper applied to spot profile 650 narrowing from an outer side to an inner side opposite the inner side. Similar to the spot profile 655, the spot profile 660 may be useful to trace a non-linear waveguide segment, wherein the variable uniform shape profile and substantially uniform intensity profile balance along the width to address the effects of exposure convolution and produce a substantially uniform cure profile.

In many embodiments, a convolution compensator is capable of modifying the shape or intensity of any laser beam spot profile into another laser beam spot profile according to a characteristic of the cross-sectional profile (e.g., width, shape profile, or intensity profile), a characteristic of a waveguide segment (e.g., waveguide width or a bend radius of the current, previous, or subsequent waveguide segment to be written), or any combination thereof. In one example, a convolution compensator modifies a slightly Gaussian, circular laser beam cross-sectional profile (e.g., variable shape profile and slightly variable intensity profile) into spot profile 650 to trace a linear waveguide segment. To trace a subsequent non-linear waveguide segment, the convolution compensator modifies the spot profile 650 into spot profile 660 to compensate for exposure convolution caused by differing ben radii between the linear and non-linear waveguide segments.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

It is noted that terms such as "top", "bottom", "above, "below", etc. may be used in this disclosure. These terms should not be construed as limiting the position or orientation of a structure, but should be used as providing spatial relationship between the structures.

Embodiments of the a method, system, and apparatus for modifying the laser beam spot profile used to trace and cure the waveguide having segments with different bend radii to provide a consistent cure profile in the waveguide are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. A system comprising:
   an electromagnetic radiation source to cure a waveguide by directing a laser beam defining a spot profile; and
   a convolution compensator positioned to modify at least one of an intensity profile and a shape of the spot profile and configured to, in response to at least one geometric property of the waveguide being written, dynamically compensate for exposure convolution in a photo-curable layer when the laser beam is directed at the photo-curable layer and translated along a non-linear path in a plane parallel to the photo-curable layer to form a non-linear waveguide segment of the waveguide, wherein the intensity profile and the shape of the spot profile each comprise an inner side and an outer side corresponding to a bend of the non-linear path, wherein during translation of the convolution compensator along the non-linear path, the convolution compensator is configured to decrease the intensity profile from the outer side toward the inner side, taper the shape of the spot profile from the outer side toward the inner side, or both.

2. The system of claim 1, wherein the convolution compensator comprises a reconfigurable filter to modify an intensity profile of the spot profile, an adaptive lens to modify a shape profile of the spot profile, or both.

3. The system of claim 1, wherein the spot profile modified by the convolution compensator compensates for exposure convolution based on at least a first geometric property of the non-linear waveguide segment to provide substantially matching waveguide curing profiles for the non-linear waveguide segment and another waveguide segment in series with the non-linear waveguide segment defining at least a second geometric property having a different value than the first geometric property.

4. The system of claim 3, wherein the first and second geometric properties are each a bend radius of the respective waveguide segment.

5. The system of claim 2, wherein at least one of:
the reconfigurable filter is continuously reconfigurable; and
the adaptable lens is continuously adaptable.

6. The system of claim 1, wherein the modified spot profile is rotatable by the convolution compensator.

7. The system of claim 1, further comprising:
a photo-curable layer; and
a translator coupled to the source to direct the source along a path to trace the non-linear waveguide segment in the photo-curable layer with the laser beam.

8. The system of claim 1, wherein the convolution compensator is further configured to form the non-linear waveguide segment with a uniform height portion.

9. The system of claim 1, wherein the convolution compensator is further configured to modify the shape of the spot profile to a closed conic section, an oval, a polygon, any rounded corner versions thereof, any symmetric versions thereof, any asymmetric versions thereof, any combination of linear or non-linear lines to form an outer perimeter, any tapered versions thereof, or any combinations thereof.

10. The system of claim 3, wherein the another waveguide segment is linear.

* * * * *